(12) United States Patent
Everist

(10) Patent No.: US 12,032,731 B2
(45) Date of Patent: Jul. 9, 2024

(54) SELF-TRACKING CONTROLLER FOR INTERACTION IN AN ARTIFICIAL REALITY ENVIRONMENT

(71) Applicant: Meta Platforms Technologies, LLC, Menlo Park, CA (US)

(72) Inventor: Nicholas Friele Everist, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/737,868

(22) Filed: May 5, 2022

(65) Prior Publication Data

US 2023/0359267 A1    Nov. 9, 2023

(51) Int. Cl.
*G06F 3/01* (2006.01)
*G06F 3/041* (2006.01)
*G06T 19/00* (2011.01)

(52) U.S. Cl.
CPC .............. *G06F 3/011* (2013.01); *G06F 3/016* (2013.01); *G06F 3/041* (2013.01); *G06T 19/006* (2013.01)

(58) Field of Classification Search
CPC .......... G06F 3/011; G06F 3/016; G06F 3/041; G06T 19/006
See application file for complete search history.

(56) References Cited

U.S. PATENT DOCUMENTS

| | | |
|---|---|---|
| 2008/0204401 A1 | 8/2008 | Lin et al. |
| 2015/0165311 A1 | 6/2015 | Ikeda et al. |
| 2016/0175711 A1* | 6/2016 | Billington ................ G08B 6/00 340/407.2 |
| 2019/0138107 A1 | 5/2019 | Nietfeld et al. |
| 2019/0325651 A1* | 10/2019 | Bradner .............. A63F 13/5255 |
| 2021/0346795 A1 | 11/2021 | Gary |

OTHER PUBLICATIONS

EPO—International Search Report and Written Opinion for International Application No. PCT/US2023/021196, dated Sep. 21, 2023, 17 pages.

* cited by examiner

*Primary Examiner* — Adam R. Giesy
(74) *Attorney, Agent, or Firm* — McDermott Will & Emery LLP

(57) ABSTRACT

A controller for interacting with an artificial reality environment and related methods, systems, and storage media are disclosed. The controller may include a base. The base may include at least one sensor for self-tracking movements by the controller. The controller may include a thumb plate coupled to the base. The thumb plate may include a touchpad, one or more actuators, and/or a joystick. The one or more actuators may include buttons. The controller may include a handle coupled to the base. The handle may include one or more triggers. The controller is configured to activate a precision pinch feature based on inputs received from the touchpad and at least one trigger.

20 Claims, 10 Drawing Sheets

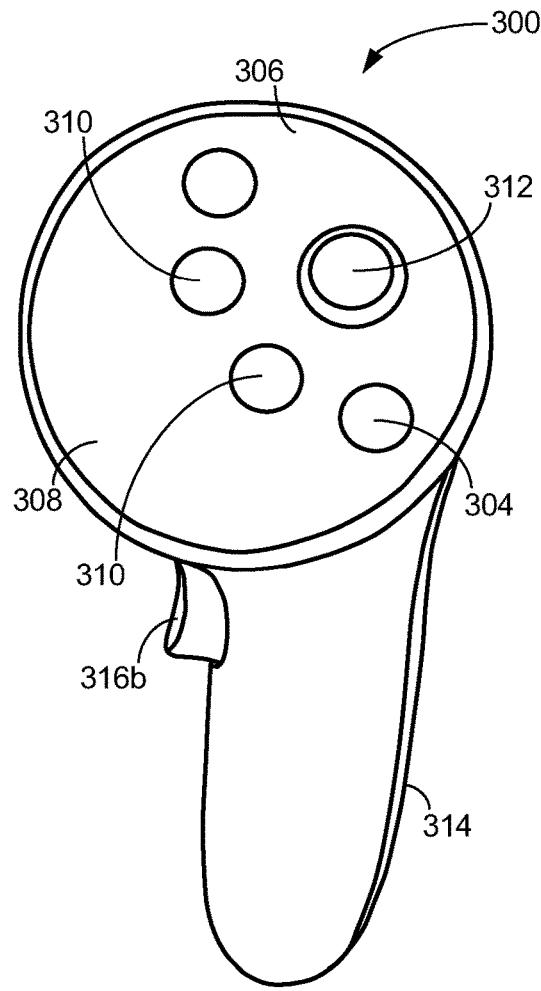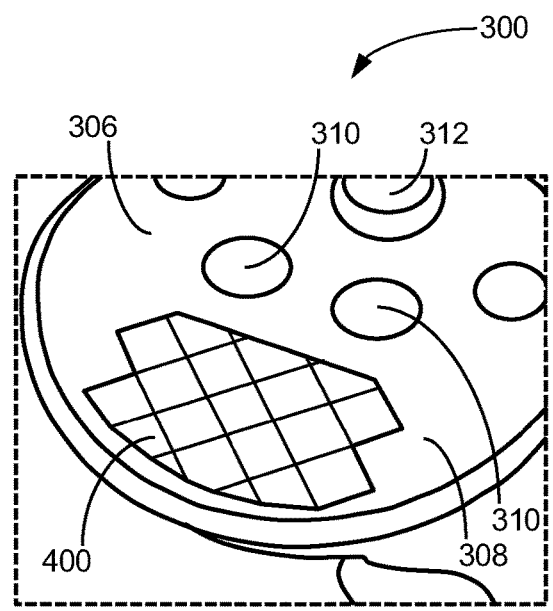
FIG. 4A
FIG. 4B

SELF-TRACKING CONTROLLER FOR INTERACTION IN AN ARTIFICIAL REALITY ENVIRONMENT

TECHNICAL FIELD

The present disclosure generally relates to controllers for artificial reality environments, and more particularly to self-tracking controllers for interactions in virtual environments.

BACKGROUND

Artificial reality, extended reality, or extra reality (collectively "XR") is a form of reality that has been adjusted in some manner before presentation to a user, which may include, e.g., virtual reality (VR), augmented reality (AR), mixed reality (MR), hybrid reality, or some combination and/or derivatives thereof. Users often experience artificial reality environments through devices such as head-mounted displays (HMDs), handheld controllers, and/or other controllers that provide visual, audible, and/or tactile information to individual users.

BRIEF SUMMARY

The subject disclosure provides for controllers for artificial reality environments and related systems and methods. A user is allowed to perform fine-motor activities within artificial reality environments. For example, a user may control a virtual hand to point and curl at index finger of the virtual hand and/or use the index finger and a thumb of the virtual hand to "pinch" small virtual objects.

Aspects of the present disclosure relate to a controller for interacting with an artificial reality environment. The controller may include a base. The base may include at least one sensor for self-tracking movements by the controller. The controller may include a thumb plate coupled to the base. The thumb plate may include a touchpad, one or more actuators, and/or a joystick. The one or more actuators may include buttons. The controller may include a handle coupled to the base. The handle may include one or more triggers. The controller is configured to activate a precision pinch feature based on inputs received from the touchpad and at least one trigger.

One aspect of the present disclosure relates to a method for sensing inputs to a controller configured for interacting with an artificial reality environment. The method may include receiving sensing inputs from sensors on a base of the controller for self-tracking movements by the controller. The method may include receiving actuator inputs from actuators on a thumb plate coupled to the base of the controller. The method may include receiving touchpad inputs from a touchpad on the thumb plate of the controller. The method may include receiving joystick inputs from a joystick on the thumb plate of the controller. The method may include receiving trigger inputs from triggers on a handle coupled to the base of the controller. The method may include determining the movements of the controller through the sensing inputs. The method may include generating a virtual interaction based on the movements, the actuator inputs, the touchpad inputs, the joystick inputs, and/or the trigger inputs. The method may include causing display of the virtual interaction.

Another aspect of the present disclosure relates to a system configured for sensing inputs to a controller configured for interacting with an artificial reality environment. The system may include one or more hardware processors configured by machine-readable instructions. The processor(s) may be configured to receive sense inputs from sensors on a base of the controller for self-tracking movements by the controller. The processor(s) may be configured to receive actuator inputs from actuators on a thumb plate coupled to the base of the controller. The processor(s) may be configured to receive touchpad inputs from a touchpad on the thumb plate of the controller. The processor(s) may be configured to receive joystick inputs from a joystick on the thumb plate of the controller. The processor(s) may be configured to receive trigger inputs from triggers on a handle coupled to the base of the controller. The processor(s) may be configured to determine the movements of the controller through the sensing inputs. The processor(s) may be configured to generate a virtual interaction based on the movements, the actuator inputs, the touchpad inputs, the joystick inputs, and/or the trigger inputs. The virtual interaction may include a fine motor activity. The processor(s) may be configured to cause display of the virtual interaction. The display may be caused through a head-mounted display for artificial reality environments. The display of the virtual interaction may include presenting a virtual hand that performs part or all of the virtual interaction.

Yet another aspect of the present disclosure relates to a non-transient computer-readable storage medium having instructions embodied thereon, the instructions being executable by one or more processors to perform a method for sensing inputs to a controller configured for interacting with an artificial reality environment. The method may include receiving sensing inputs from sensors on a base of the controller for self-tracking movements by the controller. The method may include receiving actuator inputs from actuators on a thumb plate coupled to the base of the controller. The method may include receiving touchpad inputs from a touchpad on the thumb plate of the controller. The method may include receiving joystick inputs from a joystick on the thumb plate of the controller. The method may include receiving trigger inputs from triggers on a handle coupled to the base of the controller. The method may include determining the movements of the controller through the sensing inputs. The method may include generating a virtual interaction based on the movements, the actuator inputs, the touchpad inputs, the joystick inputs, and/or the trigger inputs. The method may include causing display of the virtual interaction.

Still another aspect of the present disclosure relates to a system configured for sensing inputs to a controller configured for interacting with an artificial reality environment. The system may include means for receiving sensing inputs from sensors on a base of the controller for self-tracking movements by the controller. The system may include means for receiving actuator inputs from actuators on a thumb plate coupled to the base of the controller. The system may include means for receiving touchpad inputs from a touchpad on the thumb plate of the controller. The system may include means for receiving joystick inputs from a joystick on the thumb plate of the controller. The system may include means for receiving trigger inputs from triggers on a handle coupled to the base of the controller. The system may include means for determining the movements of the controller through the sensing inputs. The system may include means for generating a virtual interaction based on the movements, the actuator inputs, the touchpad inputs, the joystick inputs, and/or the trigger inputs. The system may include means for causing display of the virtual interaction.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIGS. 4A and 4B illustrate different views of an example thumb plate of the self-tracking controller of FIGS. 3A and 3B, in accordance with one or more implementations.

Figure 1:
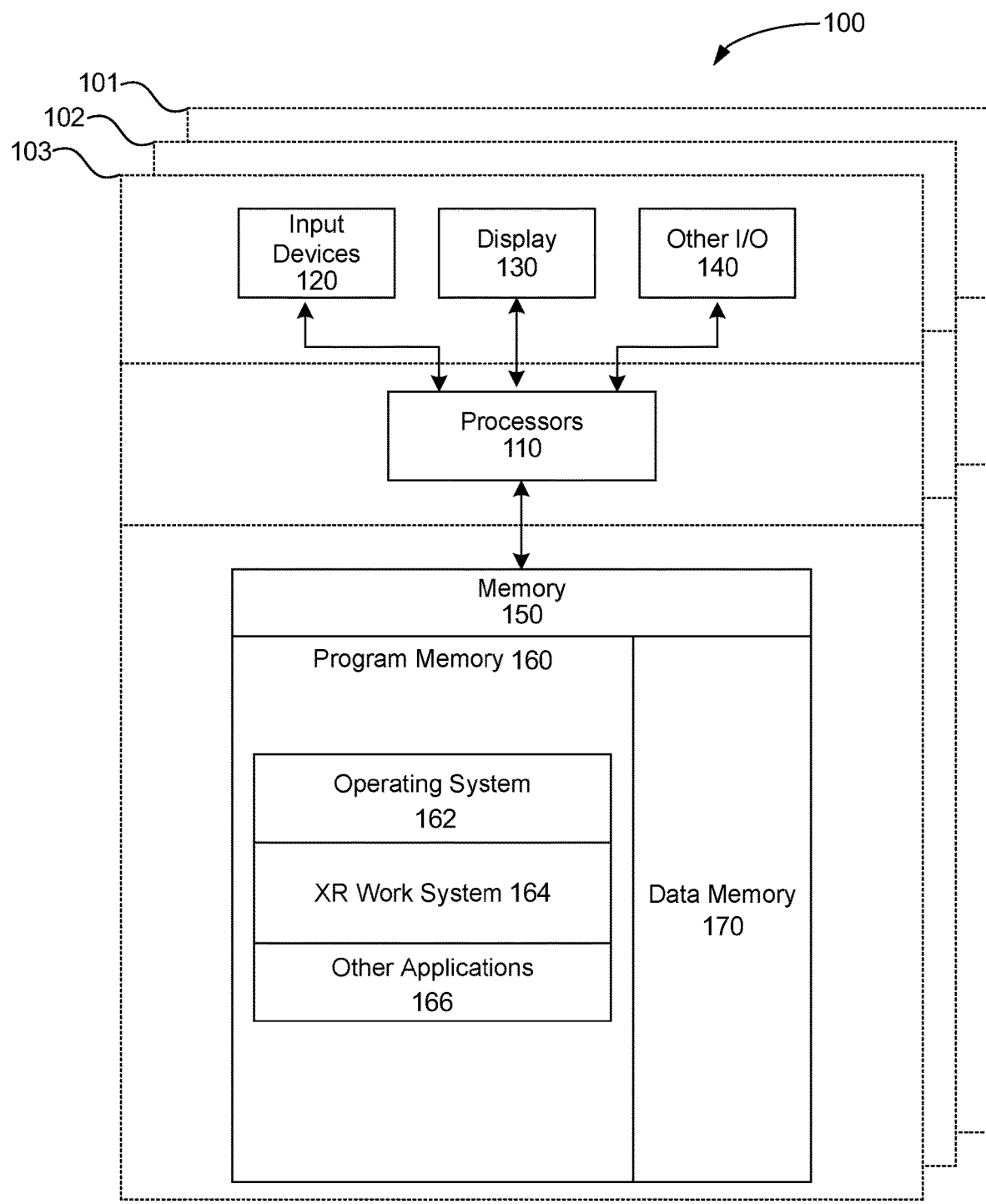
FIG. 1 is a block diagram illustrating an overview of devices on which some implementations of the disclosed technology can operate.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

With existing artificial reality systems, users may have limited ability to manipulate virtual objects in artificial reality environments. For example, a user may be able to use a handheld controller to perform coarse manual actions such as pushing a door open or "grasping" a hammer with a virtual hand. Fine motor actions in artificial reality environments, however, are not facilitated with existing technologies. Fine motor actions or activities may involve synchronization of a user's hands and fingers through the user coordinating of small muscles in movement with the user's eyes.

The subject disclosure provides for systems and methods for controllers for artificial reality environments. A user is allowed to perform fine-motor activities within artificial reality environments. For example, a user may control a virtual hand to point and curl at index finger of the virtual hand and/or use the index finger and a thumb of the virtual hand to "pinch" small virtual objects.

Implementations described herein address the aforementioned shortcomings and other shortcomings by providing a handheld controller that facilitates fine motor activities in artificial reality environments. For example, some implementations include a variable resistance trigger with full-range position tracking, allowing users to point with and curl an index finger of a virtual hand. This may allow a user to dial a virtual phone or scratch a virtual lottery ticket. Some implementations may provide a pressure sensor for a user's thumb, allowing users to precisely "pinch" together an index finger and thumb of a virtual hand. This may allow a user to pick up and move pieces on a virtual chess board. Localized haptic feedback may be provided at the trigger and/or the pressure sensor at the user's thumb to enhance sensations of performing fine motor actions in artificial reality environments.

Embodiments of the disclosed technology may include or be implemented in conjunction with an artificial reality system. Artificial reality, extended reality, or extra reality (collectively "XR") is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real-world after they have passed through a computing system. For example, a tablet with a camera on the back can capture images of the real-world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, an MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Several implementations are discussed below in more detail in reference to the figures. FIG. 1 is a block diagram illustrating an overview of devices on or with which some implementations of the disclosed technology can operate. The devices can comprise hardware components of a computing system 100 that can create, administer, and provide interaction modes for an artificial reality collaborative working environment. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across one of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, XR work system 164, and other application programs 166. Memory 150 can also include data memory 170 that can include information to be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
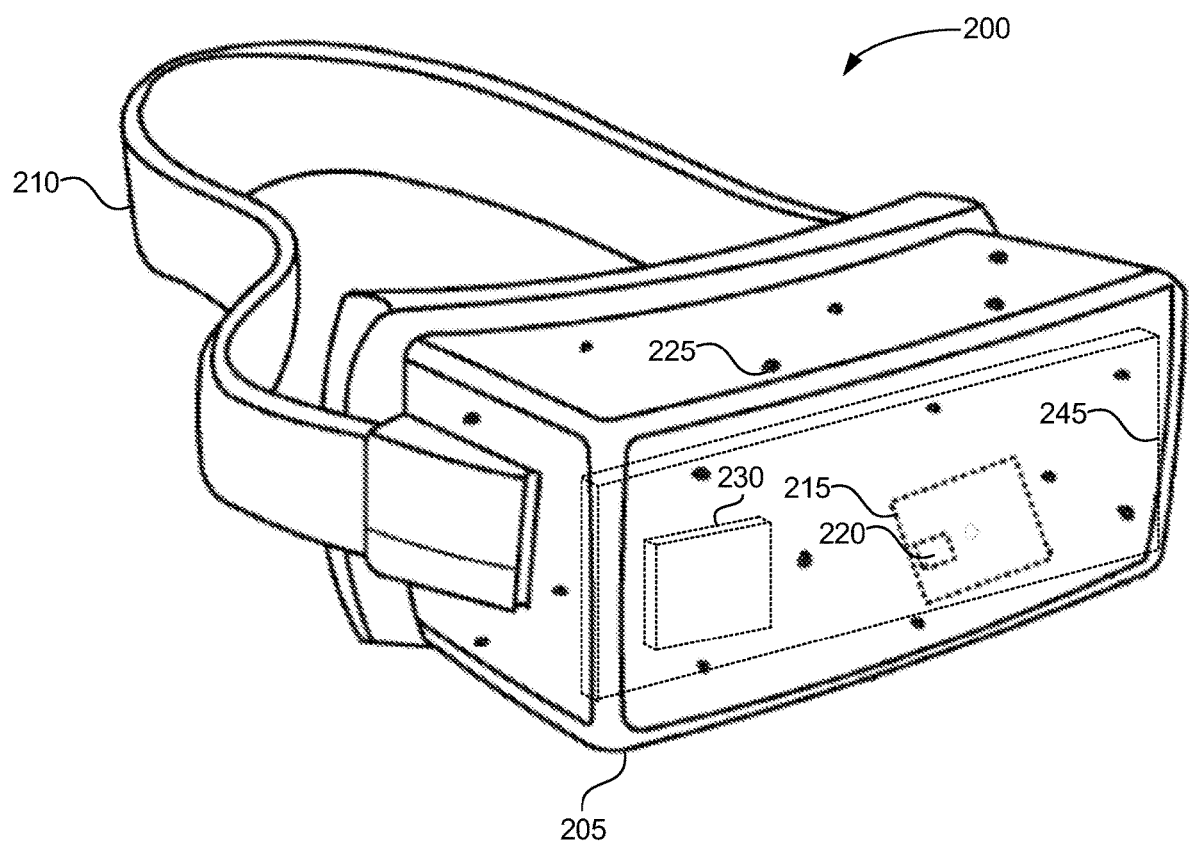
FIG. 2A is a wire diagram of a virtual reality head-mounted display (HMD), in accordance with one or more implementations.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
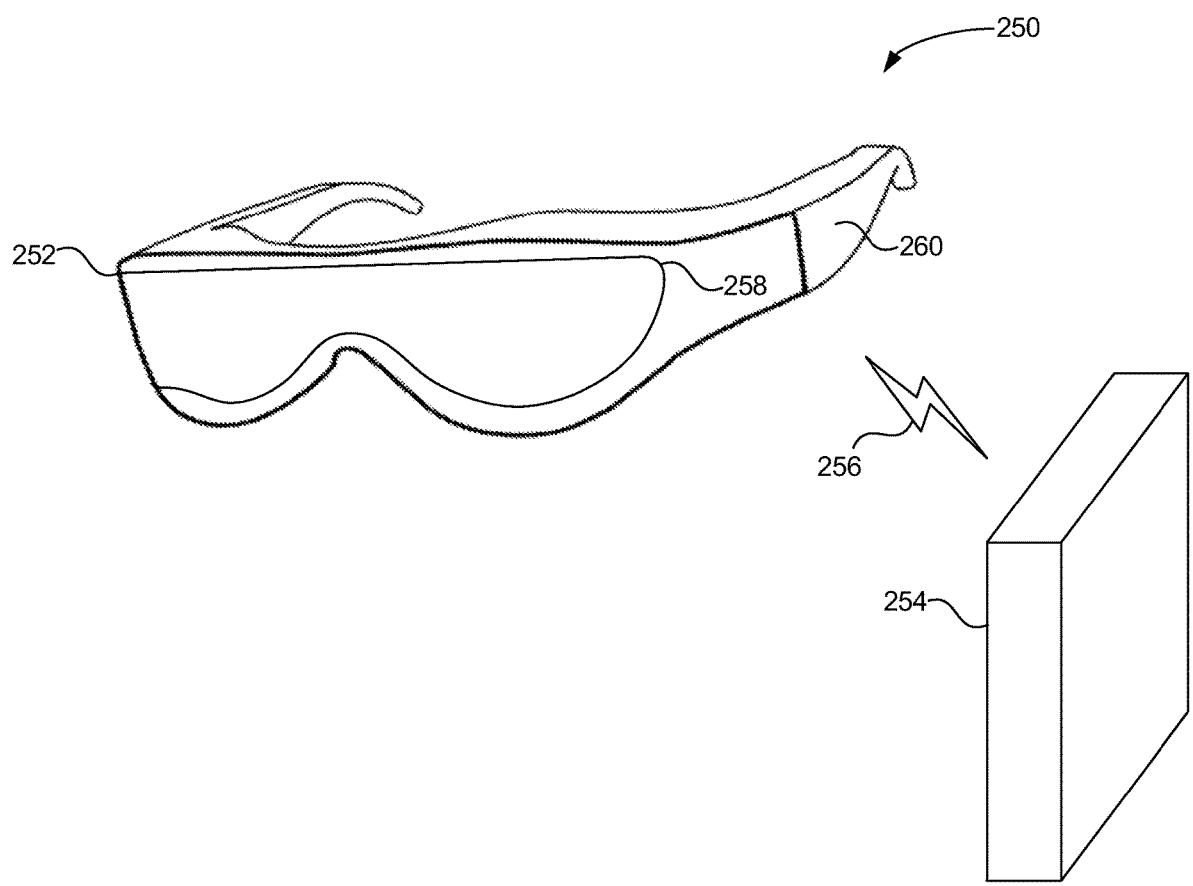
FIG. 2B is a wire diagram of a mixed reality HMD system which includes a mixed reality HMD and a core processing component, in accordance with one or more implementations.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 3A:
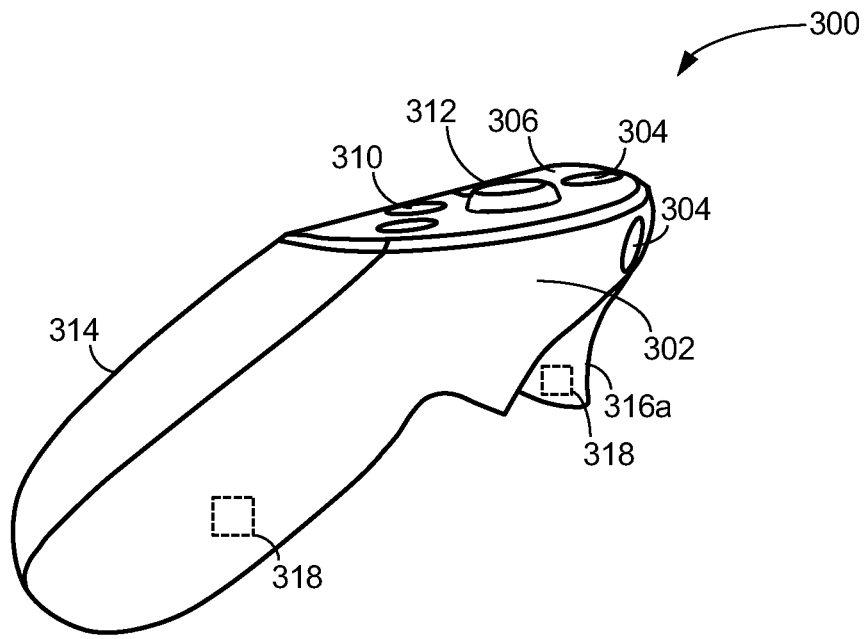
FIGS. 3A and 3B illustrate different views of an example self-tracking controller, in accordance with one or more implementations.
Figure 3B:
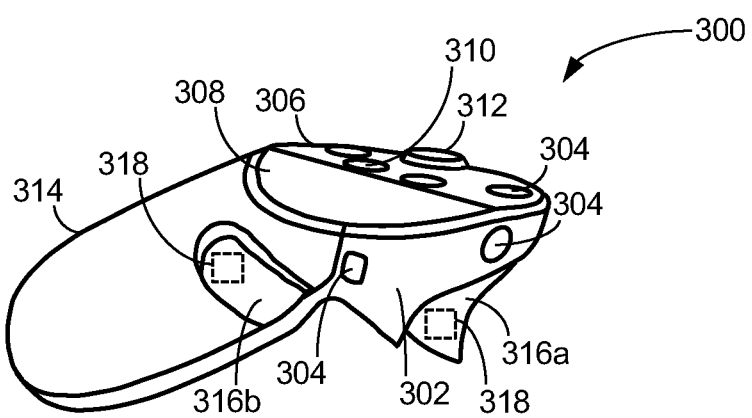

FIGS. 3A and 3B illustrate different views of an example self-tracking controller 300, in accordance with one or more implementations. The controller 300 may be configured for interacting with an artificial reality environment. The controller 300 may be configured to communicatively pair with a head-mounted display (e.g., the HMD 200 of FIG. 2A and/or the HMD system 250 of FIG. 2B) for artificial reality environments. The controller 300 may be one of a pair of controllers configured to be used contemporaneously (e.g., one in each hand of a user).

The controller 300 may include a base 302. The base 302 may include at least one sensor 304. The sensor(s) 304 may be configured to collect information used to determine a position and/or motion of the controller. The information may include optical information (e.g., visible, infrared, etc.), spatial information (e.g., LIDAR output), movement information (e.g., MEMS output), biometric information (e.g., whether user is holding controller 300) and/or other types of information. The sensor(s) 304 may be located on at least one side of the base 302. The sensor(s) 304 may include at least one camera. In some embodiments, the controller 300 may include a first sensor 304 and a second sensor 304 located on different sides of the base 302. A field of view of the first sensor 304 may overlap with a field of view of the second sensor 304.

The sensor(s) 304 may be configured for self-tracking movements by the controller 300. In other words, the sensor(s) 304 may be configured to facilitate determinations of the position and/or motion of the controller 300 without external sensors. Because external sensors are not needed, the controller 300 may have an unlimited tracking volume (or at least one not defined by the placement of external sensors).

The controller 300 may include a thumb plate 306 coupled to the base 302. The thumb plate 306 may include a touchpad 308, one or more actuators 310, a joystick 312, and/or other components. The touchpad 308 may be configured to contact a user's thumb. The user may provide inputs to the touchpad 308 with their thumb by touching different locations on the touchpad 308, moving their thumb across the touchpad 308, applying pressure to the touchpad 308, and/or other thumb gestures. The actuator(s) 310 may include buttons and/or other binary input devices. The joystick 312 may be configured to move linearly (e.g., up, down, left, right, diagonal, etc.), circularly (e.g., clockwise, counterclockwise, etc.), and/or in other motions. In some implementations, the joystick 312 may be configured to be depressed (e.g., a binary button push).

The controller 300 may include a handle 314 coupled to the base 302. The controller 300 may be configured for either a right hand (e.g., the controller 300 as shown in FIG. 3A) or a left hand (e.g., the controller 300 shown in FIG. 3B). The handle 314 may be configured to be held by the user by grasping with three or more fingers around the handle 314. The handle 314 may include one or more actuators 310 and/or one or more triggers 316. When the user is holding the controller 300, the user's index finger may align with trigger 316a and/or the user's thumb may align with trigger 316b. The thumb plate 306 may be positioned such that, when the user is holding the handle 314 of the controller 300 with one hand, the user's thumb can rest on the thumb plate 306 and/or apply orthogonal force to the thumb plate 306. The controller 300 may be configured to activate a precision pinch feature based on inputs received from the touchpad 308 and/or at least one trigger 316. For example, the precision pinch feature may be based at least in part on simultaneous inputs received from the touchpad and at least one trigger.

The trigger(s) 316 may have variable resistance when pulled by the user. That is, the resistance felt by the user when they squeeze a trigger 316 may be different at different times. The variable resistance may be determined in response to and/or based on a fine motor activity performed by a user. For example, the trigger resistance may increase when an index finger and/or thumb of a virtual hand being controlled by controller 300 comes into contact with a virtual object (e.g., when picking up the virtual object). Such an increase in resistance may give the user a sensation of "touching" the virtual object. According to some implementations, the trigger(s) 316 may be configured with a long throw (e.g., more than one centimeter of travel) or a short throw (e.g., less than one centimeter of travel).

The controller 300 may include one or more haptics actuators 318. The haptics actuator(s) 318 may be configured to provide haptic feedback to a user holding the controller 300. The haptics actuator(s) 318 may be configured to provide haptic feedback to a user performing a fine motor activity. The haptic feedback may provide an experience of touch through application of one or more of vibrations, force, motions, and/or other haptic feedback. Examples of haptics actuator(s) 318 may include one or more of an eccentric rotating mass (ERM) actuator, a linear resonant actuator (LRA), piezoelectric actuators, servomotors, and/or other haptics actuators. In some implementations, haptic feedback is localized at one or more different positions on the controller 300. For example, in some implementations, the controller 300 comprises a first haptics actuator 318 disposed at a trigger 316. The controller 300 may include a second haptics actuator 318 disposed at the thumb plate 306. Thus, haptic feedback can be applied selectively to the user's index finger, the user's thumb, the user's palm, and/or other locations.

FIGS. 4A and 4B illustrate different views of an example thumb plate 306 of the controller 300 of FIGS. 3A and 3B, in accordance with one or more implementations. As shown in FIG. 4A, the thumb plate 306 may include one or more of sensor(s) 304, the touchpad 308, the actuator(s) 310, the joystick 312, and/or other components. Also visible in FIG. 4A is the handle 314 and the trigger 316b. FIG. 4B shows a detailed inset of FIG. 4A providing more details on the touchpad 308, according to some implementations. The touchpad 308 may be disposed at a portion of the thumb plate 306. The touchpad 308 may be configured for sensing input from a thumb of a user. The touchpad 308 may include a touch sensor 400. Examples of the touch sensor 400 may include one or more of a capacitive sensor, a tactile sensor, a pressure sensor array, optically based tactile sensors, strain gauge rosettes, and/or other touch sensors.

Figure 5A:
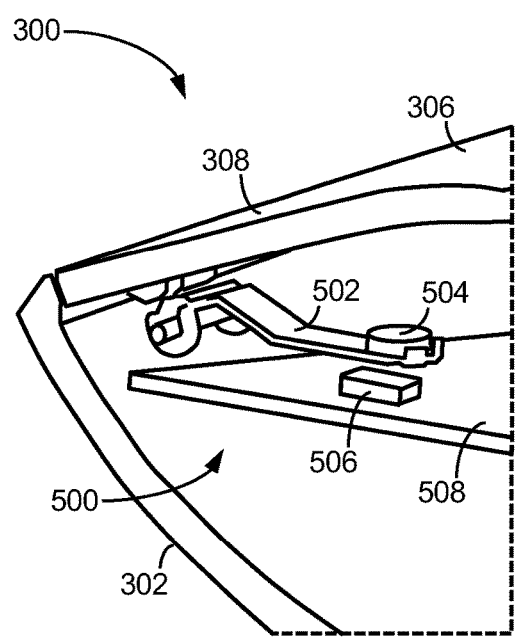
FIGS. 5A and 5B illustrate different positions of a capacitive sensor of a touchpad of the self-tracking controller of FIGS. 3A and 3B, in accordance with one or more implementations.
Figure 5B:
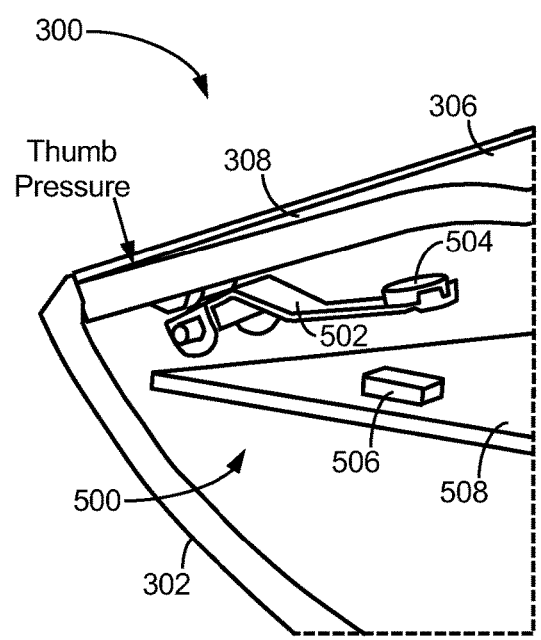

FIGS. 5A and 5B illustrate different positions of a sensor 500 of the touchpad 308 of the controller 300 of FIGS. 3A and 3B, in accordance with one or more implementations. The sensor 500 may include a Hall effect sensor (or Hall sensor) configured to detect a presence and/or magnitude of a magnetic field by using the Hall effect. The controller 300 is shown in a cutaway view in FIGS. 5A and 5B to reveal some internal structure associated with sensor 500. The sensor 500 may be disposed within the controller 300 adjacent or proximate to the thumb plate 306 and/or touch pad 308. Put differently, thumb plate 306 and/or touchpad 308 may include sensor 500. In some implementations, the thumb plate 306 may be configured to be deflected responsive to pressure (e.g., orthogonal force) being applied by a user's thumb, as illustrated in FIG. 5B. As the thumb plate 306 is deflected and/or depressed, a cantilever 502 of the sensor 500 may pivot such that a magnetic object 504 on a distal end the cantilever 502 moves away from a conductor 506 disposed on a printed circuit board (PCB) 508. The PCB 508 may be fixed relative to the body 302 of controller 300. As the magnetic object 504 moves away from the conductor 506, magnetic field located therebetween may change, which may be detected through the sensor 500. A range of pressures applied to the thumb plate 306 (e.g., by a user's thumb) may be detected by measuring levels of and/or changes in the magnetic field between the magnetic object 504 and the conductor 506.

Figure 6A:
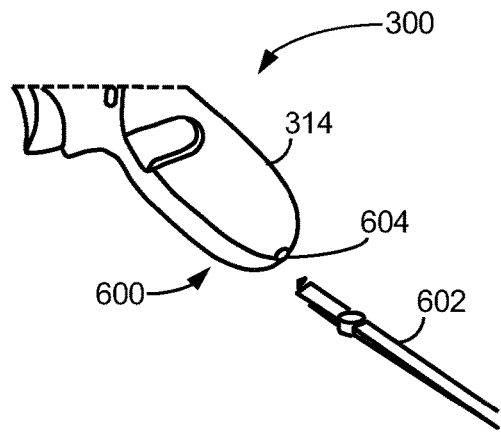
FIGS. 6A, 6B, 6C, and 6D illustrate different configurations for a bottom of a handle of the self-tracking controller of FIGS. 3A and 3B, in accordance with one or more implementations.

FIGS. 6A, 6B, 6C, and 6D illustrate different configurations for a bottom 600 of the handle 314 of the controller 300 of FIGS. 3A and 3B, in accordance with one or more implementations. The bottom 600 may include a distal end of the handle 314. As shown in FIG. 6A, the controller 300 may include a removable lanyard 602. The removeable lanyard 602 may be couplable to the bottom 600 of the handle 314 at a receptacle 604. A user may utilize the removeable lanyard 602 by slipping their wrist through the removeable lanyard 602 prior to grasping the handle 314 of controller 300. The removeable lanyard 602 may be a safety feature of the controller 300 to keep the controller 300 from flying out of a user's hand during use.

Figure 6B:
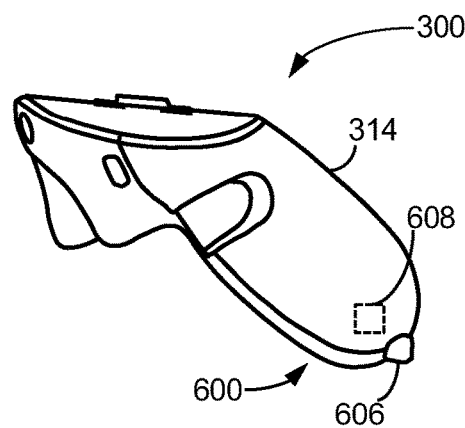

FIG. 6B shows the controller 300 with a removable stylus tip 606 inserted into the receptacle 604. The controller 300 may include a removable stylus tip 606 couplable to the bottom 600 of the handle 314. The bottom 600 may include a pressure sensor 608. The pressure sensor 608 may be configured to detect pressure applied to the removable stylus tip 606. The pressure sensor 608 may include a force sensitive resistor (FSR). In some implementations, the removable stylus tip 606 may contact the FSR enabling analog measurement of force applied to the removable stylus tip 606. The removable stylus tip 606 may allow a user to use the controller 300 as a pressure sensitive writing instrument within the artificial reality environment. The removable stylus tip 606 may improve writing experiences in artificial reality environments by enabling accurate contact point detection with a physical surface. In some implementations, stroke parameters (e.g., thickness, weight, etc.) may vary based on applied pressure.

Figure 6C:
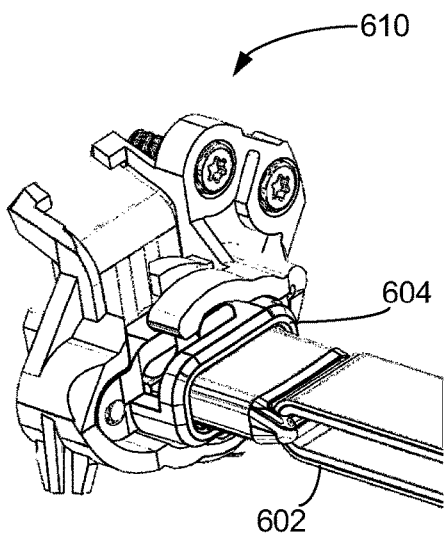
Figure 6D:
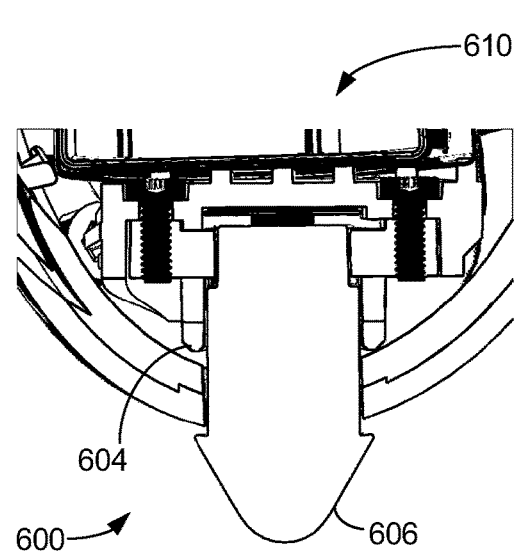

FIGS. 6C and 6D show different views of an example receptacle assembly 610, according to one or more implementations. FIG. 6C shows the receptacle assembly 610 with the removable lanyard 602 coupled with (e.g., inserted into) the receptacle 604. The receptacle assembly 610 may include one or more mechanism to removably couple removable lanyard 602 with the receptacle 604. FIG. 6D shows the receptacle assembly 610 with the removable stylus tip 606 coupled with (e.g., inserted into) the receptacle 604 of the bottom 600 of the controller 300. The receptacle assembly 610 may include one or more mechanism to removably couple stylus tip 606 with the receptacle 604.

The disclosed system(s) address a problem in traditional artificial reality environment control techniques tied to computer technology, namely, the technical problem of manipulating small virtual objects through fine-motor activities. The disclosed system solves this technical problem by providing a solution also rooted in computer technology, namely, by providing for self-tracking controllers for interactions in virtual environments. The disclosed subject technology further provides improvements to the functioning of the computer itself because it improves processing and efficiency in controllers for artificial reality environments.

Figure 7:
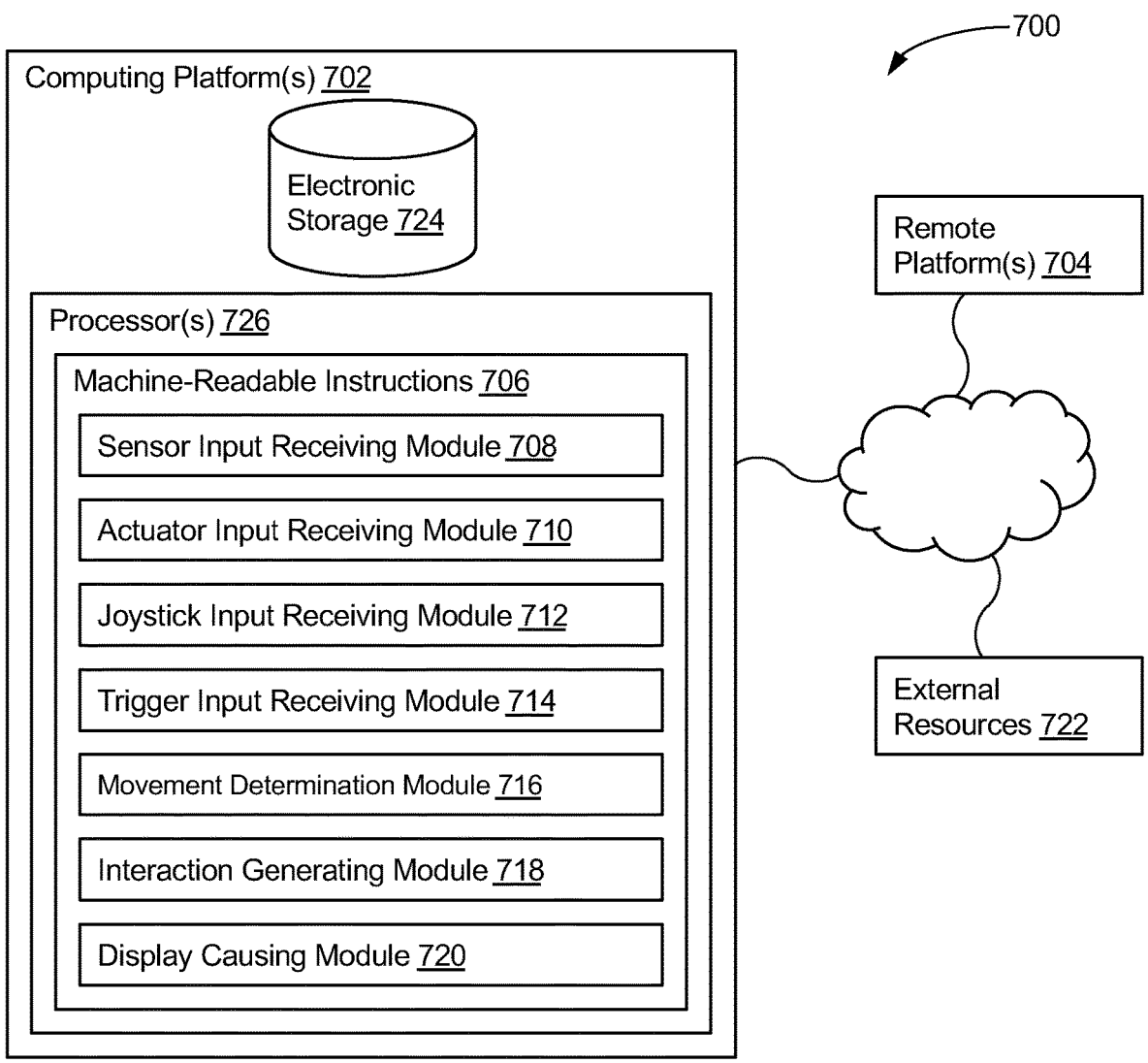
FIG. 7 illustrates a system configured for sensing inputs to a controller configured for interacting with an artificial reality environment, in accordance with one or more implementations.

FIG. 7 illustrates a system 700 configured for sensing inputs to a controller configured for interacting with an artificial reality environment, in accordance with one or more implementations. In some implementations, system 700 may include one or more computing platforms 702. Computing platform(s) 702 may be configured to communicate with one or more remote platforms 704 according to a client/server architecture, a peer-to-peer architecture, and/or other architectures. Remote platform(s) 704 may be configured to communicate with other remote platforms via computing platform(s) 702 and/or according to a client/server architecture, a peer-to-peer architecture, and/or other architectures. Users may access system 700 via computing platform(s) 702 and/or remote platform(s) 704.

Computing platform(s) 702 may be configured by machine-readable instructions 706. Machine-readable instructions 706 may include one or more instruction modules. The instruction modules may include computer program modules. The instruction modules may include one or more of sensor input receiving module 708, actuator input receiving module 710, joystick input receiving module 712, trigger input receiving module 714, movement determination module 716, interaction generating module 718, display causing module 720, and/or other instruction modules.

Sensor input receiving module 708 may be configured to receive sense inputs from sensors (e.g., the sensor(s) 304) on a base (e.g., the base 302) of the controller (e.g., the controller 300) for self-tracking movements by the controller. Sensor input receiving module 708 may be configured to receive touchpad inputs from a touchpad (e.g., the touchpad 308) on a thumb plate (e.g., the thumb plate 306) of the controller.

Actuator input receiving module 710 may be configured to receive actuator inputs from actuators (e.g., the actuator(s) 310) on a thumb plate coupled to the base of the controller.

Joystick input receiving module 712 may be configured to receive joystick inputs from a joystick (e.g., the joystick 312) on the thumb plate of the controller.

Trigger input receiving module 714 may be configured to receive trigger inputs from triggers (e.g., trigger 316*a* and/or trigger 316*b*) on a handle (e.g., the handle 314) coupled to the base of the controller.

Movement determination module 716 may be configured to determine the movements of the controller through the sensing inputs.

Interaction generating module 718 may be configured to generate a virtual interaction based on one or more of the movements, the actuator inputs, the touchpad inputs, the joystick inputs, and/or the trigger inputs. The virtual interaction may emulate pointing (e.g., using an index finger) and/or pinching (e.g., using an index finger and thumb). The virtual interaction may provide an ability to discern force applied. By way of non-limiting example, the virtual interaction may include one or more of picking up a virtual object, pressing a virtual button, and/or other fine motor activities.

Display causing module 720 may be configured to cause display of the virtual interaction. The display may be caused through a head-mounted display (e.g., the HMD 200 and/or the HMD 252) for artificial reality environments. The display of the virtual interaction may include presenting a virtual hand that performs part or all of the virtual interaction.

In some implementations, computing platform(s) 702, remote platform(s) 704, and/or external resources 722 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 702, remote platform(s) 704, and/or external resources 722 may be operatively linked via some other communication media.

A given remote platform 704 may include one or more processors configured to execute computer program modules. The computer program modules may be configured to enable an expert or user associated with the given remote platform 704 to interface with system 700 and/or external resources 722, and/or provide other functionality attributed herein to remote platform(s) 704. By way of non-limiting example, a given remote platform 704 and/or a given computing platform 702 may include one or more of a server, a desktop computer, a laptop computer, a handheld computer, a tablet computing platform, a NetBook, a Smartphone, a gaming console, an augmented reality system (e.g., mixed reality HMD system 250), a head-mounted display (e.g., HMD 200 and/or HMD 252), a handheld controller (e.g., the controller 300), and/or other computing platforms.

External resources 722 may include sources of information outside of system 700, external entities participating with system 700, and/or other resources. In some implementations, some or all of the functionality attributed herein to external resources 722 may be provided by resources included in system 700.

Computing platform(s) 702 may include electronic storage 724, one or more processors 726, and/or other components. Computing platform(s) 702 may include communication lines, or ports to enable the exchange of information with a network and/or other computing platforms. Illustration of computing platform(s) 702 in FIG. 7 is not intended to be limiting. Computing platform(s) 702 may include a plurality of hardware, software, and/or firmware components operating together to provide the functionality attributed herein to computing platform(s) 702. For example, computing platform(s) 702 may be implemented by a cloud of computing platforms operating together as computing platform(s) 702.

Electronic storage 724 may comprise non-transitory storage media that electronically stores information. The electronic storage media of electronic storage 724 may include one or both of system storage that is provided integrally (i.e., substantially non-removable) with computing platform(s) 702 and/or removable storage that is removably connectable to computing platform(s) 702 via, for example, a port (e.g., a USB port, a firewire port, etc.) or a drive (e.g., a disk drive, etc.). Electronic storage 724 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 724 may include one or more virtual storage resources (e.g., cloud storage, a virtual private network, and/or other virtual storage resources). Electronic storage 724 may store software algorithms, information determined by processor(s) 726, information received from computing platform(s) 702, information received from remote platform(s) 704, and/or other information that enables computing platform(s) 702 to function as described herein.

Processor(s) 726 may be configured to provide information processing capabilities in computing platform(s) 702. As such, processor(s) 726 may include one or more of a digital processor, an analog processor, a digital circuit designed to process information, an analog circuit designed to process information, a state machine, and/or other mechanisms for electronically processing information. Although processor(s) 726 is shown in FIG. 7 as a single entity, this is for illustrative purposes only. In some implementations, processor(s) 726 may include a plurality of processing units. These processing units may be physically located within the same device, or processor(s) 726 may represent processing functionality of a plurality of devices operating in coordination. Processor(s) 726 may be configured to execute modules 708, 710, 712, 714, 716, 718, and/or 720, and/or other modules. Processor(s) 726 may be configured to execute modules 708, 710, 712, 714, 716, 718, and/or 720, and/or other modules by software; hardware; firmware; some combination of software, hardware, and/or firmware; and/or other mechanisms for configuring processing capabilities on processor(s) 726. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 708, 710, 712, 714, 716, 718, and/or 720 are illustrated in FIG. 7 as being implemented within a single processing unit, in implementations in which processor(s) 726 includes multiple processing units, one or more of modules 708, 710, 712, 714, 716, 718, and/or 720 may be implemented remotely from the other modules. The description of the functionality provided by the different modules 708, 710, 712, 714, 716, 718, and/or 720 described below is for illustrative purposes, and is not intended to be limiting, as any of modules 708, 710, 712, 714, 716, 718, and/or 720 may provide more or less functionality than is described. For example, one or more of modules 708, 710, 712, 714, 716, 718, and/or 720 may be eliminated, and some or all of its functionality may be provided by other ones of modules 708, 710, 712, 714, 716, 718, and/or 720. As another example, processor(s) 726 may be configured to execute one or more additional modules that may perform some or all of the functionality attributed below to one of modules 708, 710, 712, 714, 716, 718, and/or 720.

In particular embodiments, one or more objects (e.g., content or other types of objects) of a computing system may be associated with one or more privacy settings. The one or more objects may be stored on or otherwise associated with any suitable computing system or application, such as, for example, a social-networking system, a client system, a third-party system, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular embodiments, privacy settings may be based on one or more nodes or edges of a social graph. A privacy setting may be specified for one or more edges or edge-types of the social graph, or with respect to one or more nodes, or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system. The object may be associated with a concept node connected to a user node of the first user by an edge. The first user may specify privacy settings that apply to a particular edge connecting to the concept node of the object, or may specify privacy settings that apply to all edges connecting to the concept node. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers may be authorization/privacy servers for enforcing privacy settings. In response to a request from a user (or other entity) for a particular object stored in a data store, the social-networking system may send a request to the data store for the object. The request may identify the user associated with the request and the object may be sent only to the user (or a client system of the user) if the authorization server determines that the user is authorized to access the object based on the privacy settings associated with the object. If the requesting user is not authorized to access the object, the authorization server may prevent the requested object from being retrieved from the data store or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system may access such information in order to provide a particular function or service to the first user, without the social-networking system having access to that information for any other purposes. Before accessing, storing, or using such objects or information, the social-networking system may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system.

In particular embodiments, a user may specify whether particular types of objects or information associated with the first user may be accessed, stored, or used by the social-networking system. As an example and not by way of limitation, the first user may specify that images sent by the first user through the social-networking system may not be stored by the social-networking system. As another example and not by way of limitation, a first user may specify that messages sent from the first user to a particular second user may not be stored by the social-networking system. As yet another example and not by way of limitation, a first user may specify that all objects sent via a particular application may be saved by the social-networking system.

In particular embodiments, privacy settings may allow a first user to specify whether particular objects or information associated with the first user may be accessed from particular client systems or third-party systems. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system may provide default privacy settings with respect to each device, system, or application, and/or the first user may be prompted to specify a particular privacy setting for each context. As an example and not by way of limitation, the first user may utilize a location-services feature of the social-networking system to provide recommendations for restaurants or other places in proximity to the user. The first user's default privacy settings may specify that the social-networking system may use location information provided from a client device of the first user to provide the location-based services, but that the social-networking system may not store the location information of the first user or provide it to any third-party system. The first user may then update the privacy settings to allow location information to be used by a third-party image-sharing application in order to geo-tag photos.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular embodiments, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The social-networking system may determine that this privacy setting also applies to the first image and make the first image visible only to the first user group. In particular embodiments, the change in privacy settings may take effect only going forward. Continuing the example above, if the first user changes privacy settings and then shares a second image, the second image may be visible only to the first user group, but the first image may remain visible to all users. In particular embodiments, in response to a user action to change a privacy setting, the social-networking system may further prompt the user to indicate whether the user wants to apply the changes to the privacy setting retroactively. In particular embodiments, a user change to privacy settings may be a one-off change specific to one object. In particular embodiments, a user change to privacy may be a global change for all objects associated with the user.

In particular embodiments, the social-networking system may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular embodiments, upon determining that a trigger action has occurred, the social-networking system may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular embodiments, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social-networking system may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the social-networking system may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular embodiments, a user may need to provide verification of a privacy setting on a periodic basis. A prompt or reminder may be periodically sent to the user based either on time elapsed or a number of user actions. As an example and not by way of limitation, the social-networking system may send a reminder to the user to confirm his or her privacy settings every six months or after every ten photo posts. In particular embodiments, privacy settings may also allow users to control access to the objects or information on a per-request basis. As an example and not by way of limitation, the social-networking system may notify the user whenever a third-party system attempts to access information associated with the user, and require the user to provide verification that access should be allowed before proceeding.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 8:
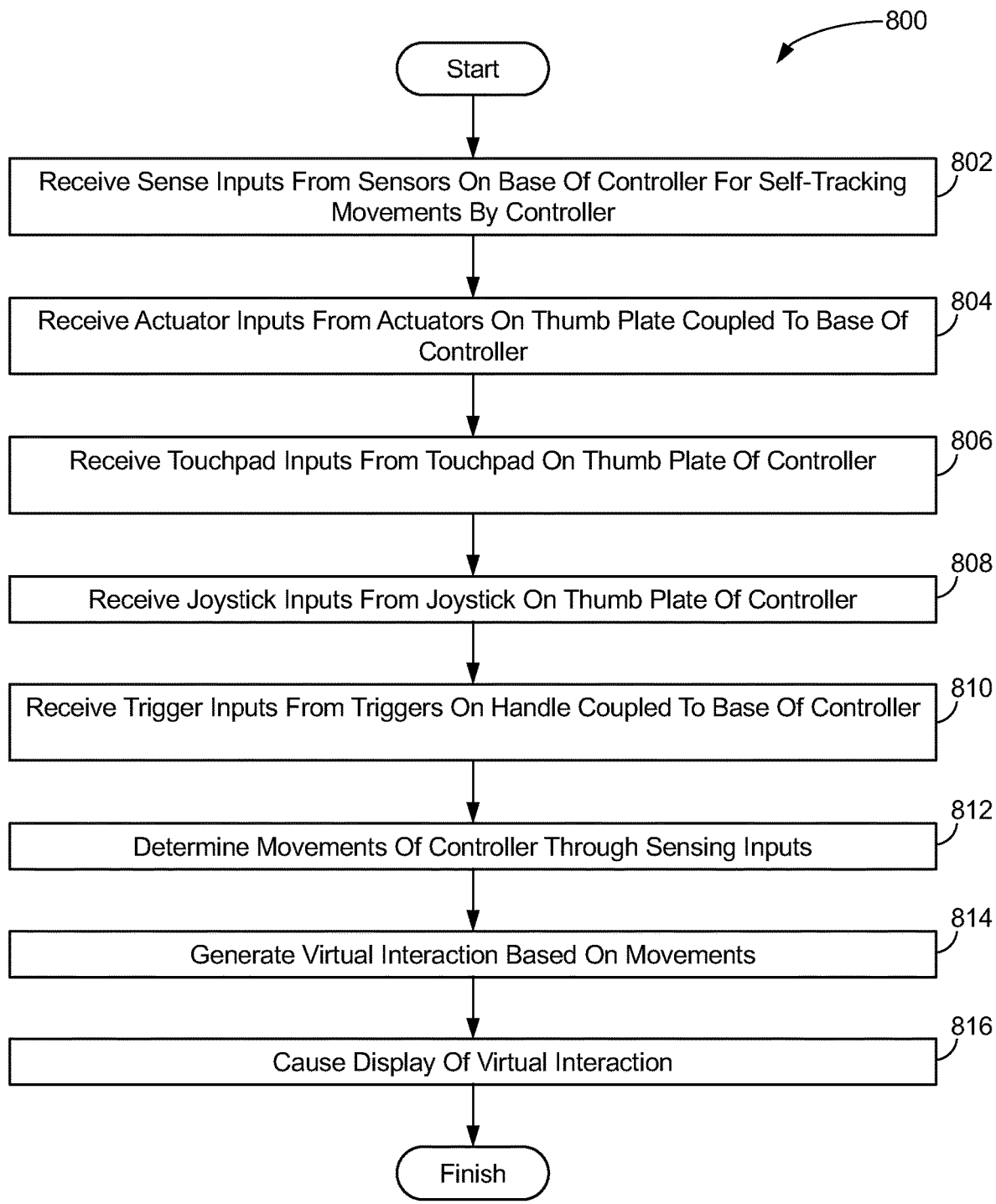
FIG. 8 illustrates an example flow diagram for sensing inputs to a controller configured for interacting with an artificial reality environment, according to certain aspects of the disclosure.

FIG. 8 illustrates an example flow diagram (e.g., process 800) for sensing inputs to a controller configured for interacting with an artificial reality environment, according to certain aspects of the disclosure. For explanatory purposes, the example process 800 is described herein with reference to FIGS. 1-7. Further for explanatory purposes, the steps of the example process 800 are described herein as occurring in serial, or linearly. However, multiple instances of the example process 800 may occur in parallel. For purposes of explanation of the subject technology, the process 800 will be discussed in reference to FIGS. 1-7.

At step 802, the process 800 may include receiving sensing inputs from sensors on a base of the controller for self-tracking movements by the controller. At step 804, the process 800 may include receiving actuator inputs from actuators on a thumb plate coupled to the base of the controller. At step 806, the process 800 may include receiving touchpad inputs from a touchpad on the thumb plate of the controller. At step 808, the process 800 may include receiving joystick inputs from a joystick on the thumb plate of the controller. At step 810, the process 800 may include receiving trigger inputs from triggers on a handle coupled to the base of the controller. At step 812, the process 800 may include determining the movements of the controller through the sensing inputs. At step 814, the process 800 may include generating a virtual interaction based on the movements, the actuator inputs, the touchpad inputs, the joystick inputs, and/or the trigger inputs. At step 816, the process 800 may include causing display of the virtual interaction.

For example, as described above in relation to FIG. 7, at step 802, the process 800 may include receiving sensing inputs from sensors on a base of the controller for self-tracking movements by the controller, through sensor input receiving module 708. At step 804, the process 800 may include receiving actuator inputs from actuators on a thumb plate coupled to the base of the controller, through actuator input receiving module 710. At step 806, the process 800 may include receiving touchpad inputs from a touchpad on the thumb plate of the controller, through sensor input receiving module 708. At step 808, the process 800 may include receiving joystick inputs from a joystick on the thumb plate of the controller, through joystick input receiving module 712. At step 810, the process 800 may include receiving trigger inputs from triggers on a handle coupled to the base of the controller, through trigger input receiving module 714. At step 812, the process 800 may include determining the movements of the controller through the sensing inputs, through movement determination module 716. At step 814, the process 800 may include generating a virtual interaction based on one or more of the movements, the actuator inputs, the touchpad inputs, the joystick inputs, and/or the trigger inputs, through interaction generating module 718. At step 816, the process 800 may include causing display of the virtual interaction, through display causing module 720.

According to an aspect, the virtual interaction includes one or more of picking up a virtual object, pressing a virtual button, and/or other fine motor activities.

According to an aspect, the display is caused through a head-mounted display for artificial reality environments.

According to an aspect, the display of the virtual interaction includes presenting a virtual hand that performs part or all of the virtual interaction.

Figure 9:
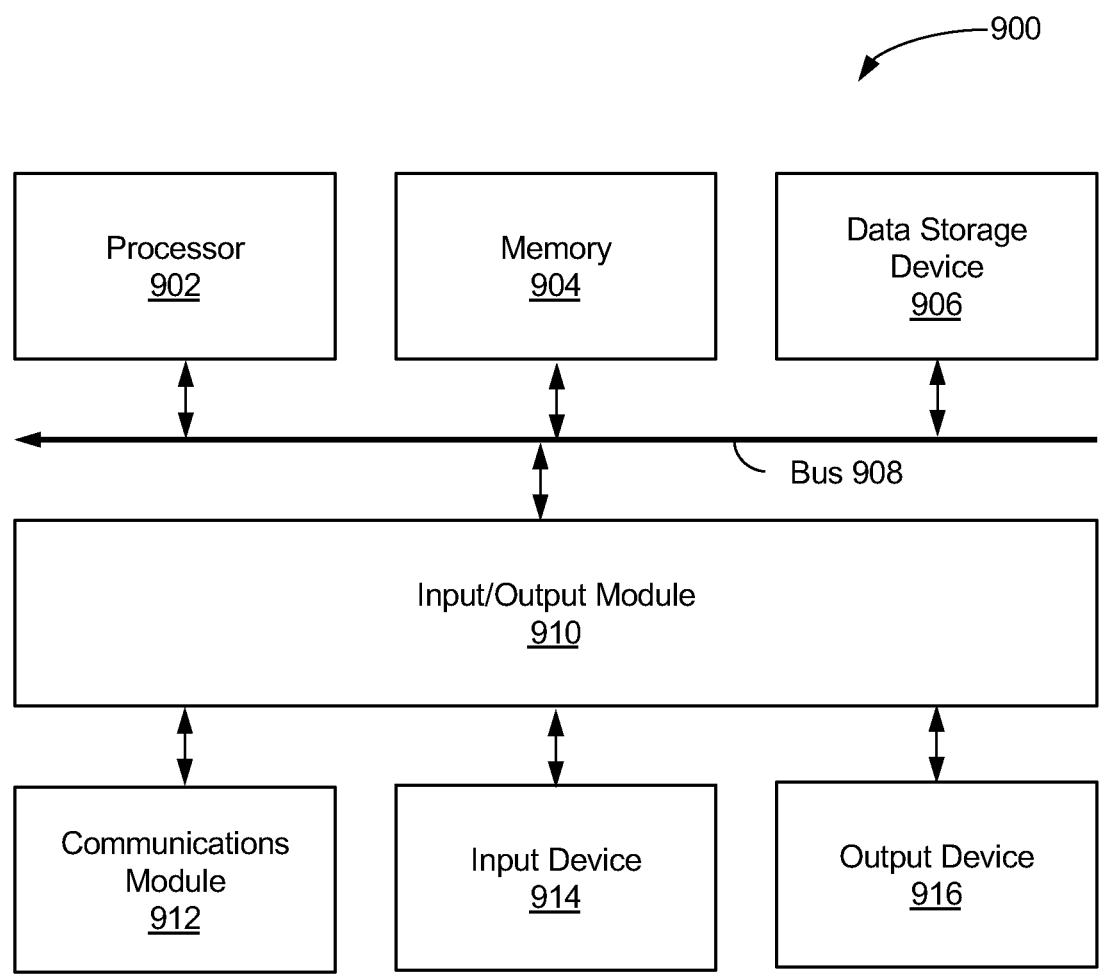
FIG. 9 is a block diagram illustrating an example computer system (e.g., representing both client and server) with which aspects of the subject technology can be implemented.

FIG. 9 is a block diagram illustrating an exemplary computer system 900 with which aspects of the subject technology can be implemented. In certain aspects, the computer system 900 may be implemented using hardware or a combination of software and hardware, either in a dedicated server, integrated into another entity, or distributed across multiple entities.

Computer system 900 (e.g., server and/or client) includes a bus 908 or other communication mechanism for communicating information, and a processor 902 coupled with bus 908 for processing information. By way of example, the computer system 900 may be implemented with one or more processors 902. Processor 902 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 900 can include, in addition to hardware, code that creates an execution environment for the computer program in question, e.g., code that constitutes processor firmware, a protocol stack, a database management system, an operating system, or a combination of one or more of them stored in an included memory 904, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 908 for storing information and instructions to be executed by processor 902. The processor 902 and the memory 904 can be supplemented by, or incorporated in, special purpose logic circuitry.

The instructions may be stored in the memory 904 and implemented in one or more computer program products, i.e., one or more modules of computer program instructions encoded on a computer-readable medium for execution by, or to control the operation of, the computer system 900, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 904 may also be used for storing temporary variable or other intermediate information during execution of instructions to be executed by processor 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 900 further includes a data storage device 906 such as a magnetic disk or optical disk, coupled to bus 908 for storing information and instructions. Computer system 900 may be coupled via input/output module 910 to various devices. The input/output module 910 can be any input/output module. Exemplary input/output modules 910 include data ports such as USB ports. The input/output module 910 is configured to connect to a communications module 912. Exemplary communications modules 912 include networking interface cards, such as Ethernet cards and modems. In certain aspects, the input/output module 910 is configured to connect to a plurality of devices, such as an input device 914 and/or an output device 916. Exemplary input devices 914 include a keyboard and a pointing device, e.g., a mouse or a trackball, by which a user can provide input to the computer system 900. Other kinds of input devices 914 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 916 include display devices such as an LCD (liquid crystal display) monitor, for displaying information to the user.

According to one aspect of the present disclosure, the above-described gaming systems can be implemented using a computer system 900 in response to processor 902 executing one or more sequences of one or more instructions contained in memory 904. Such instructions may be read into memory 904 from another machine-readable medium, such as data storage device 906. Execution of the sequences of instructions contained in the main memory 904 causes processor 902 to perform the process steps described herein. One or more processors in a multi-processing arrangement may also be employed to execute the sequences of instructions contained in memory 904. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 900 can include clients and servers. A client and server are generally remote from each other and typically interact through a communication network. The relationship of client and server arises by virtue of computer programs running on the respective computers and having a client-server relationship to each other. Computer system 900 can be, for example, and without limitation, a desktop computer, laptop computer, or tablet computer. Computer system 900 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 902 for execution. Such a medium may take many forms, including, but not limited to, non-volatile media, volatile media, and transmission media. Non-volatile media include, for example, optical or magnetic disks, such as data storage device 906. Volatile media include dynamic memory, such as memory 904. Transmission media include coaxial cables, copper wire, and fiber optics, including the wires that comprise bus 908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 900 reads game data and provides a game, information may be read from the game data and stored in a memory device, such as the memory 904. Additionally, data from the memory 904 servers accessed via a network the bus 908, or the data storage 906 may be read and loaded into the memory 904. Although data is described as being found in the memory 904, it will be understood that data does not have to be stored in the memory 904 and may be stored in other memory accessible to the processor 902 or distributed among several media, such as the data storage 906.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A controller for interacting with an artificial reality environment, comprising:
    a base comprising at least one sensor for self-tracking movements by the controller;
    a thumb plate coupled to the base, the thumb plate comprising:
        a touchpad including a Hall effect sensor comprising a cantilever configured to pivot through a magnetic field, and
        one or more actuators, wherein the one or more actuators comprise a plurality of buttons; and
    a handle coupled to the base, the handle comprising one or more triggers,
    wherein the controller is configured to activate a precision pinch feature based on inputs received from the touchpad and at least one trigger.

2. The controller of claim 1, wherein the artificial reality environment comprises augmented reality and/or virtual reality (AR/VR).

3. The controller of claim 1, wherein the at least one sensor is located on at least one side of the base.

4. The controller of claim 1, wherein the at least one sensor comprises at least one camera.

5. The controller of claim 1, further comprising one or more haptics actuators.

6. The controller of claim 1, wherein the precision pinch feature comprises simultaneous inputs received from the touchpad and at least one trigger.

7. The controller of claim 1, further comprising a removable lanyard and/or a removable stylus tip coupled to a bottom of the handle, the bottom comprising a pressure sensor.

8. The controller of claim 1, wherein the touchpad comprises a capacitive sensor.

9. The controller of claim 1, wherein the touchpad is on a portion of the thumb plate.

10. The controller of claim 1, wherein the touchpad is configured for sensing input from a thumb of a user.

11. The controller of claim 1, wherein haptic feedback is localized at one or more different positions on the controller.

12. The controller of claim 1, wherein the controller comprises a first haptics actuator disposed at a first trigger of the one or more triggers, and wherein the controller comprises a second haptics actuator disposed at the thumb plate.

13. The controller of claim 12, wherein the first trigger has variable resistance when pulled by a user, and wherein the variable resistance is determined in response to and/or based on a fine motor activity performed by a user.

14. The controller of claim 1, wherein the controller is configured to communicatively pair with a head-mounted display for artificial reality environments.

15. The controller of claim 7, wherein the removable stylus tip allows a user to utilize the controller as a pressure sensitive writing instrument within the artificial reality environment.

16. A computer-implemented method for sensing inputs to a controller configured for interacting with an artificial reality environment, comprising:

receiving sensing inputs from sensors on a base of the controller for self-tracking movements by the controller;

receiving actuator inputs from actuators on a thumb plate coupled to the base of the controller wherein the actuators comprise a plurality of buttons;

receiving touchpad inputs from a touchpad on the thumb plate of the controller, the touchpad including a Hall effect sensor comprising a cantilever configured to pivot through a magnetic field;

receiving joystick inputs from a joystick on the thumb plate of the controller;

receiving trigger inputs from triggers on a handle coupled to the base of the controller;

determining the movements of the controller through the sensing inputs; generating a virtual interaction based on the movements, the actuator inputs, the touchpad inputs, the joystick inputs, and/or the trigger inputs; and causing display of the virtual interaction.

17. The computer-implemented method of claim 16, wherein the virtual interaction includes one or more of picking up a virtual object, pressing a virtual button, and/or other fine motor activities.

18. The computer-implemented method of claim 16, wherein the display is caused through a head-mounted display for artificial reality environments.

19. The computer-implemented method of claim 16, wherein the display of the virtual interaction includes presenting a virtual hand that performs part or all of the virtual interaction.

20. A system configured for sensing inputs to a controller configured for interacting with an artificial reality environment, the system comprising: one or more hardware processors configured by machine-readable instructions to:

receive sense inputs from sensors on a base of the controller for self-tracking movements by the controller;

receive actuator inputs from actuators on a thumb plate coupled to the base of the controller wherein the actuators comprise a plurality of buttons, receive touchpad inputs from a touchpad on the thumb plate of the controller, the touchpad including a Hall effect sensor comprising a cantilever configured to pivot through a magnetic field;

receive joystick inputs from a joystick on the thumb plate of the controller;

receive trigger inputs from triggers on a handle coupled to the base of the controller;

determine the movements of the controller through the sensing inputs;

generate a virtual interaction based on the movements, the actuator inputs, the touchpad inputs, the joystick inputs, and/or the trigger inputs, wherein the virtual interaction includes a fine motor activity; and cause display of the virtual interaction, wherein the display is caused through a head-mounted display for artificial reality environments, and wherein the display of the virtual interaction includes presenting a virtual hand that performs part or all of the virtual interaction.

\* \* \* \* \*